(12) United States Patent
Gattone et al.

(10) Patent No.: US 6,361,261 B1
(45) Date of Patent: Mar. 26, 2002

(54) FASTENER ASSEMBLY WITH INTERFERENCE ELEMENT

(75) Inventors: Michael T. Gattone, Oak Forest; Tao-Ming Wang, Long Grove, both of IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/728,400

(22) Filed: Dec. 1, 2000

(51) Int. Cl.[7] .................................................. F16B 21/18
(52) U.S. Cl. ........................................ 411/526; 411/520
(58) Field of Search .................................. 411/516, 520, 411/521, 525, 526, 528, 61, 508, 339

(56) References Cited

U.S. PATENT DOCUMENTS

| | | |
|---|---|---|
| 207,871 A | 9/1878 | Horton et al. |
| 1,083,697 A * | 1/1914 | Neptune |
| 1,373,645 A * | 4/1921 | Bandoly |
| 1,849,604 A | 3/1932 | Weatherhead, Jr. |
| 2,400,142 A * | 5/1946 | Tinnerman |
| 3,007,726 A * | 11/1961 | Parkin |
| 3,551,963 A | 1/1971 | Mosher |
| 4,624,585 A | 11/1986 | Nix et al. |
| 4,750,878 A | 6/1988 | Nix et al. |
| 5,098,242 A | 3/1992 | Schaty |
| 5,469,606 A | 11/1995 | Hansen |
| 5,522,635 A | 6/1996 | Downey |

FOREIGN PATENT DOCUMENTS

AU 227402 * 3/1960

* cited by examiner

Primary Examiner—Flemming Saether
(74) Attorney, Agent, or Firm—Pitney, Hardin, Kipp & Szuch LLP

(57) ABSTRACT

The fastener includes a post element, a blind aperture pivot assembly with a blind aperture into which the post element is inserted, and a rigid fastening member. The rigid fastening member secures around the post. The inclined rotationally symmetric wall deflects upon insertion into the blind aperture, but then interferes with the walls of the blind aperture to resist withdrawal.

12 Claims, 3 Drawing Sheets

FASTENER ASSEMBLY WITH INTERFERENCE ELEMENT

BACKGROUND OF THE INVENTION

1. Field of the Invention

This invention pertains to a push-in fastener assembly. The fastener assembly includes a rigid member which is affixed to a fastener which is inserted into a blind aperture. The rigid member flexes and interferes with the aperture by way of an oblique rotationally symmetric wall.

2. Description of the Prior Art

In the prior art, fasteners for plastic panels are known. However, many of these fasteners are deficient when used with apertures formed in softer plastics which can be scooped or gouged by the fastener. Additionally, many of these fasteners have required complicated installation procedures which increased installation costs.

Some examples of fasteners are disclosed in U.S. patent application Ser. No. 09/412,227 entitled "Blind Aperture Fastener" filed on Oct. 5, 1999; U.S. Pat. No. 5,522,635 entitled "Tonneau Cover and Frame for Pick-Up Trucks" issued on Jun. 4, 1996 to Downey; U.S. Pat. No. 5,469,606 entitled "Clamp Means for Joining Objects Together" issued on Nov. 28, 1995 to Hansen; U.S. Pat. No. 5,098,242 entitled "Plastic Fastener for Threaded Stud" issued on Mar. 24, 1992 to Schaty; U.S. Pat. Nos. 4,750,878 and 4,624,585, both entitled "Retainer Bushing" issued on Jun. 14, 1988 and Nov. 25, 1986, respectively, to Nix et al.; U.S. Pat. No. 3,551,963 entitled "Self-Locking Snap Fastener" and issued on Aug. 16, 1968 to Mosher, Jr. et al.; U.S. Pat. No. 1,849,604 entitled "Fastening and Connecting Device" issued on Aug. 1, 1929 to Weatherhead, Jr.; and U.S. Pat. No. 207,871 entitled "Elastic Packing for Pistons" issued on Sep. 10, 1878 to Horton et al.

OBJECTS AND SUMMARY OF THE INVENTION

It is therefore an object of the present invention to provide a fastener assembly which can be used with softer plastics with minimized gouging or scooping of the plastic.

It is therefore a further object of the present invention to provide a fastener assembly which can be installed with a simple motion thereby resulting in reduced installation costs.

It is therefore a further object of the present invention to provide a fastener assembly which fastens securely.

It is therefore a still further object of the present invention to provide a fastener assembly which can be manufactured economically.

These and other objects are attained by providing a fastener with a post which supports an outwardly concentric rigid member, preferably metallic, with an oblique rotationally symmetric wall which interferes with the blind aperture. The oblique rotationally symmetric wall is configured so that the lesser diameter oriented in the direction of insertion of the post into the blind aperture. Therefore, instead of gouging or scooping the walls of the blind aperture, there is a controlled predictable deflection of the oblique rotationally symmetric wall of the rigid member against the walls of the blind aperture of the blind aperture pivot assembly.

BRIEF DESCRIPTION OF THE DRAWINGS

Further objects and advantages will become apparent from the following description and claims, and from the accompanying drawings, wherein:

DETAILED DESCRIPTION OF THE PREFERRED EMBODIMENT

Figure 3:
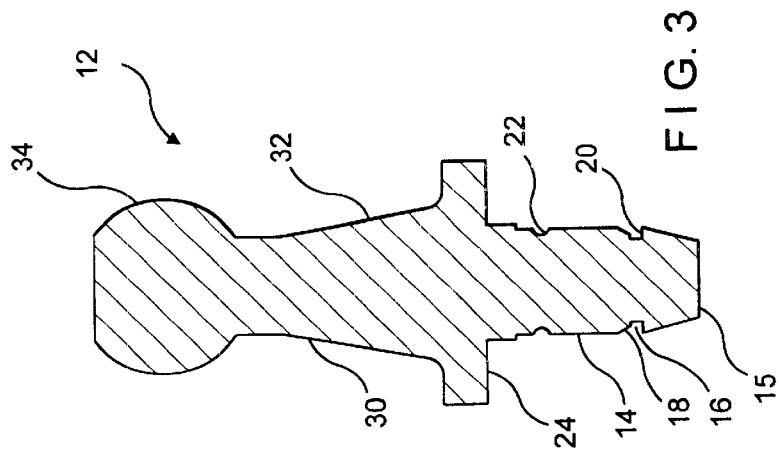
FIG. 3 is a cross-sectional view along plane 3—3 of FIG. 2 of the post of the fastener assembly of the present invention.
Figure 2:
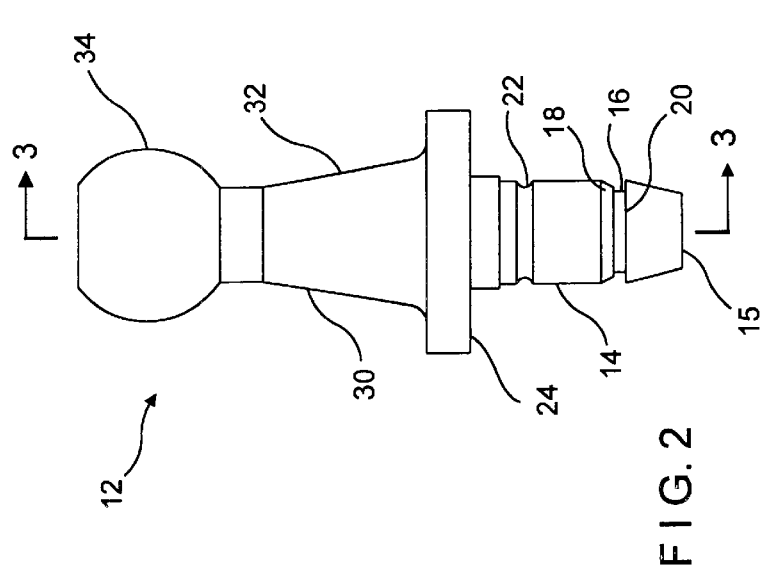
FIG. 2 is a side plan view of the post of the fastener assembly of the present invention.
Figure 4:
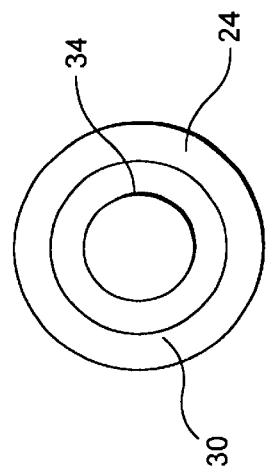
FIG. 4 is a top plan view of the post of the fastener assembly of the present invention.
Figure 1:
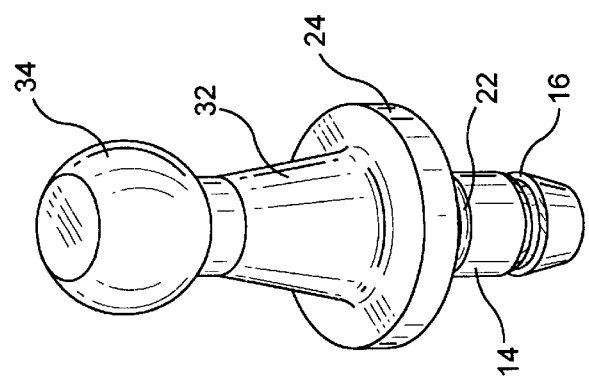
FIG. 1 is a perspective view of the post of the fastener assembly of the present invention.

Referring now to the drawings in detail wherein like numerals refer to like elements throughout the several views, one sees that FIGS. 1–4 illustrate the post 12 of fastener assembly 10.

Post 12 includes a lower cylindrical portion 14 which terminates in lower chamfered end 15. Lower cylindrical portion 14 further includes lower circumferential groove 16. Lower circumferential groove 16 includes upper wall 18 which is somewhat chamfered with respect to the wall of lower cylindrical portion 14. However, lower wall 20 of lower circumferential groove is somewhat orthogonal. Lower cylindrical portion 14 further includes upper circumferential groove 22 which has a broad semi-circular cross section. Cylindrical disk 24 is formed above lower cylindrical portion 14 and serves as a stop for the insertion of post 12, as will be explained hereinafter.

Handle portion 30 is formed above cylindrical disk 24 and includes tapered rotationally symmetric stem 32 and knob 34.

Post 12 is typically an integral piece made from 33% glass filled nylon, although those skilled in the art will recognize that a range of equivalents is available.

Figure 7:
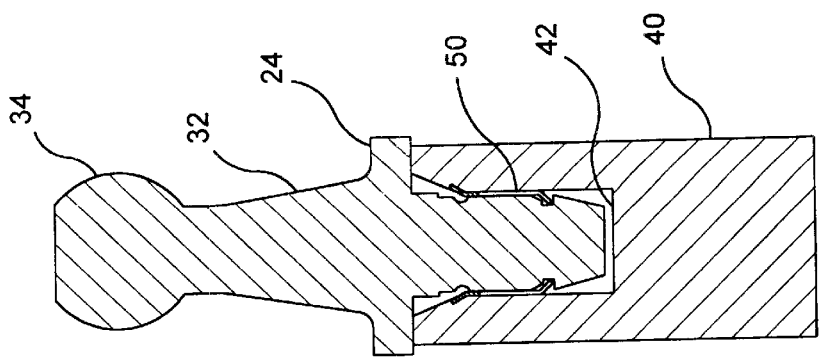
FIG. 7 is a cross-sectional view along plane 7—7 of FIG. 6 of the fastener assembly of the present invention, shown in a coupled configuration.
Figure 6:
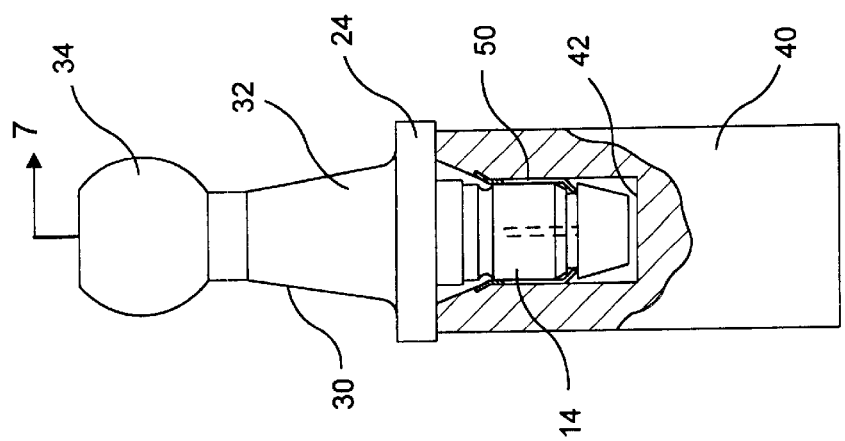
FIG. 6 is a side plan view, partially in phantom, of the fastener assembly of the present invention, shown in a coupled configuration.
Figure 5:
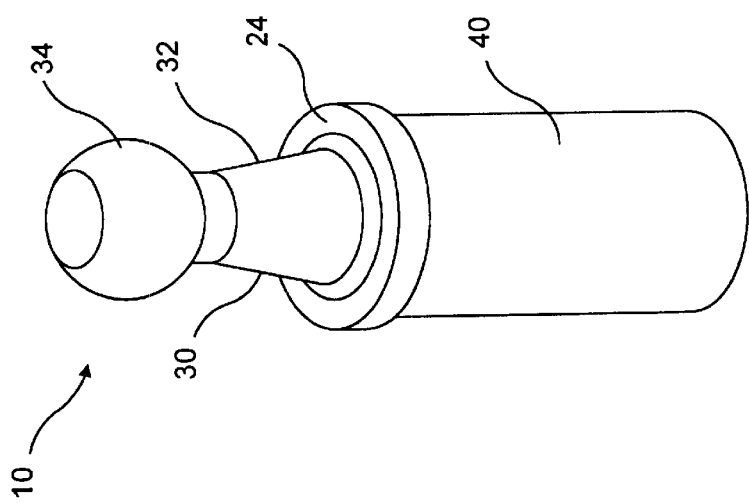
FIG. 5 is a perspective view of the fastener assembly of the present invention, shown in a coupled configuration.
Figure 10:
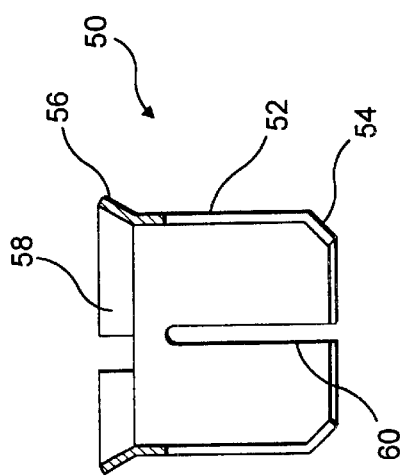
FIG. 10 is a cross-sectional view along plane 10—10 of FIG. 9 of the rigid fastener member of the fastener assembly of the present invention.

As shown in FIGS. 5–7, lower cylindrical portion 14 is inserted into blind aperture 42 of blind aperture pivot assembly 40. Blind aperture pivot assembly 40 is typically cylindrical in shape and is typically made from polycarbonate, 20% talc filled polypropolene, nylon, thermoplastic or can be part of a larger molded piece. Those skilled in the art will recognize other equivalents.

Rigid fastening member 50, which is illustrated in detail in FIGS. 8–11, is secured to lower cylindrical portion 14 of post 12 and interferes against the walls of blind aperture 42 thereby securing post 12 to blind aperture pivot assembly 40.

As shown in FIGS. 8–11, rigid fastening member 50 includes cylindrical walls 52 with lower oblique inwardly extending lip 54 and upper oblique rotationally symmetric wall 56. Upper oblique rotationally symmetric wall 56 forms mouth 58 therewithin. Upper oblique rotationally symmetric wall 56 is angled so that the largest diameter opening is presented at mouth 58, with the diameter progressively decreasing to the diameter of the interior of cylindrical walls 52. Lower oblique inwardly extending lip 54 engages or extends into lower circumferential groove 16 of lower cylindrical portion 14 of post 12. In some applications, rigid fastening member 50 may be able to pivot with respect to post 12. Slots 60 are formed along cylindrical walls 52 of rigid fastening member 50 upwardly adjacent from lower oblique inwardly extending lip 54. Slots 60 allow the lower portion of cylindrical walls 52 to expand during assembly (that is, when lower cylindrical portion 14 of post 12 is inserted into rigid fastening member 50 via mouth 58). The length and width of slots may vary, as would be known to those skilled in the art after review of the above, depending upon the diameter of post 12 being inserted and the material of the rigid fastening member 50.

Figure 11:
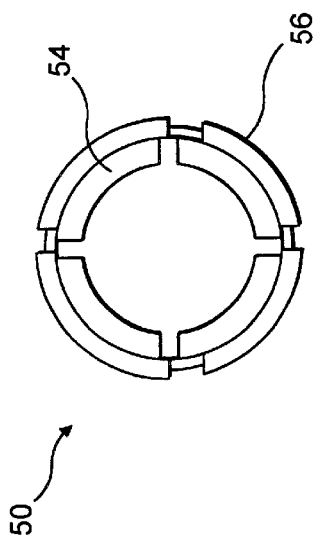
FIG. 11 is a top plan view of the rigid fastener member of the fastener assembly of the present invention.
Figure 9:
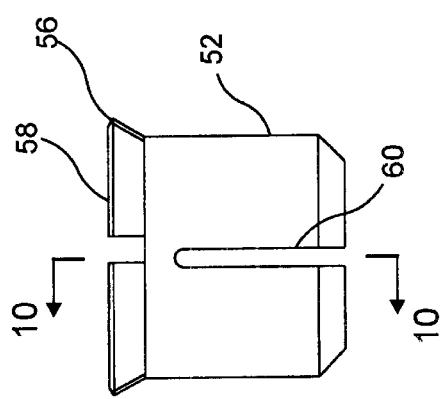
FIG. 9 is a plan view of the rigid fastener member of the fastener assembly of the present invention.
Figure 8:
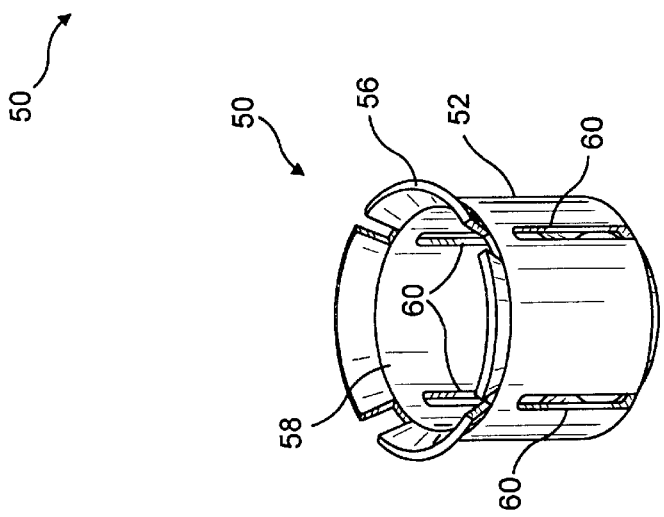
FIG. 8 is a perspective view of the rigid fastening member of the fastener assembly of the present invention.

Upper oblique rotationally symmetric wall 56 is relatively easily inserted into blind aperture 42 without scooping or gouging the material of blind aperture pivot assembly 40. However, due to the angle of inclination of upper oblique rotationally symmetric wall 56 with respect to a projection of cylindrical wall 52, illustrated at about 30°, upper oblique rotationally symmetric wall 56 interferes with blind aperture 42 and resists being pulled out of blind aperture 42 after insertion therewithin. The angle of 30° can be reduced if stiffer material is used with the blind aperture pivot assembly 40 or if a lesser minimum pull-out force is required. Typically, a range of about 15–75° is envisioned depending upon the application. Additionally, the upper oblique rotationally symmetric wall 56 does not necessarily have to be a full diameter, but alternately can be formed as segments as shown in FIG. 11. That provides an alternate way to control insertion and removal force.

Rigid fastening member 50 is primarily envisioned as being made by eyelet manufacturing equipment using 300 series stainless steel. However, if rigid fastening member 50 is shortened, progressive die tooling could be used. Carbon steel, if plated to guard against corrosion, and if necessary, heat treated, could similarly be substituted for the stainless steel. For applications requiring a lower minimum pull-out force, plastics or some engineering grade polymers could even be substituted.

To use fastener assembly 10, the user first inserts post 12 into mouth 58 of rigid fastening member 50 until lower oblique inwardly extending lip 54 is engaged within lower circumferential groove 16. Upper circumferential groove 22 then allows for inwardly flexure of cylindrical wall 52, particularly proximate to upper oblique rotationally symmetric wall 56. The user then inserts post 12 with rigid fastening member 50 attached thereto into blind aperture 42 of blind aperture pivot assembly 40 until cylindrical disk 24 is flush with either blind aperture pivot assembly 40 or an apertured panel engaged therebetween (not shown). Upper oblique rotationally symmetric wall 56 deflects somewhat during insertion but thereafter interferes with the walls of blind aperture 42 thereby securing post 12 within blind aperture pivot assembly 40.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fastener assembly including:

a post element;

an aperture assembly element with an aperture therein, said post element being inserted into said aperture in an installed position;

an interference element engaged to said post element, said interference element including a body substantially parallel to said post element, said body including a first end and a second end, said first end including an oblique wall forming a mouth with a diameter which progressively decreases to a diameter of an interior of said body, said oblique wall interfering with walls of said aperture thereby resisting withdrawal from said aperture;

an inwardly extending lip formed on said second end, said lip engaging a first circumferential groove in said post; and wherein said post includes a second circumferential groove which allows for inward deflection of said body proximate to said oblique wall.

2. The fastener assembly of claim 1 wherein said post, said aperture, and said body are substantially cylindrical, and said oblique wall is rotationally symmetric.

3. The fastener assembly of claim 2 wherein said oblique wall forms an angle with respect to a projection of said body in a range of 15–75°.

4. The fastener assembly of claim 3 wherein said oblique wall forms an angle with respect to a projection of said body of about 30°.

5. The fastener assembly of claim 4 wherein said aperture is a blind aperture.

6. The fastener assembly of claim 5 wherein said post includes a handle portion.

7. The fastener assembly of claim 6 wherein said post includes a cylindrical disk substantially perpendicular thereto.

8. The fastener assembly of claim 7 wherein said post is made of plastic.

9. The fastener assembly of claim 7 wherein said post is made of 33% glass filled nylon.

10. The fastener assembly of claim 7 wherein said interference element is made of stainless steel.

11. The fastener assembly of claim 7 wherein said aperture assembly element is made of polycarbonate.

12. The fastener assembly of claim 7 wherein said aperture assembly element is made of 2% talc filled polypropolene.

\* \* \* \* \*